United States Patent Office 2,990,863
Patented July 4, 1961

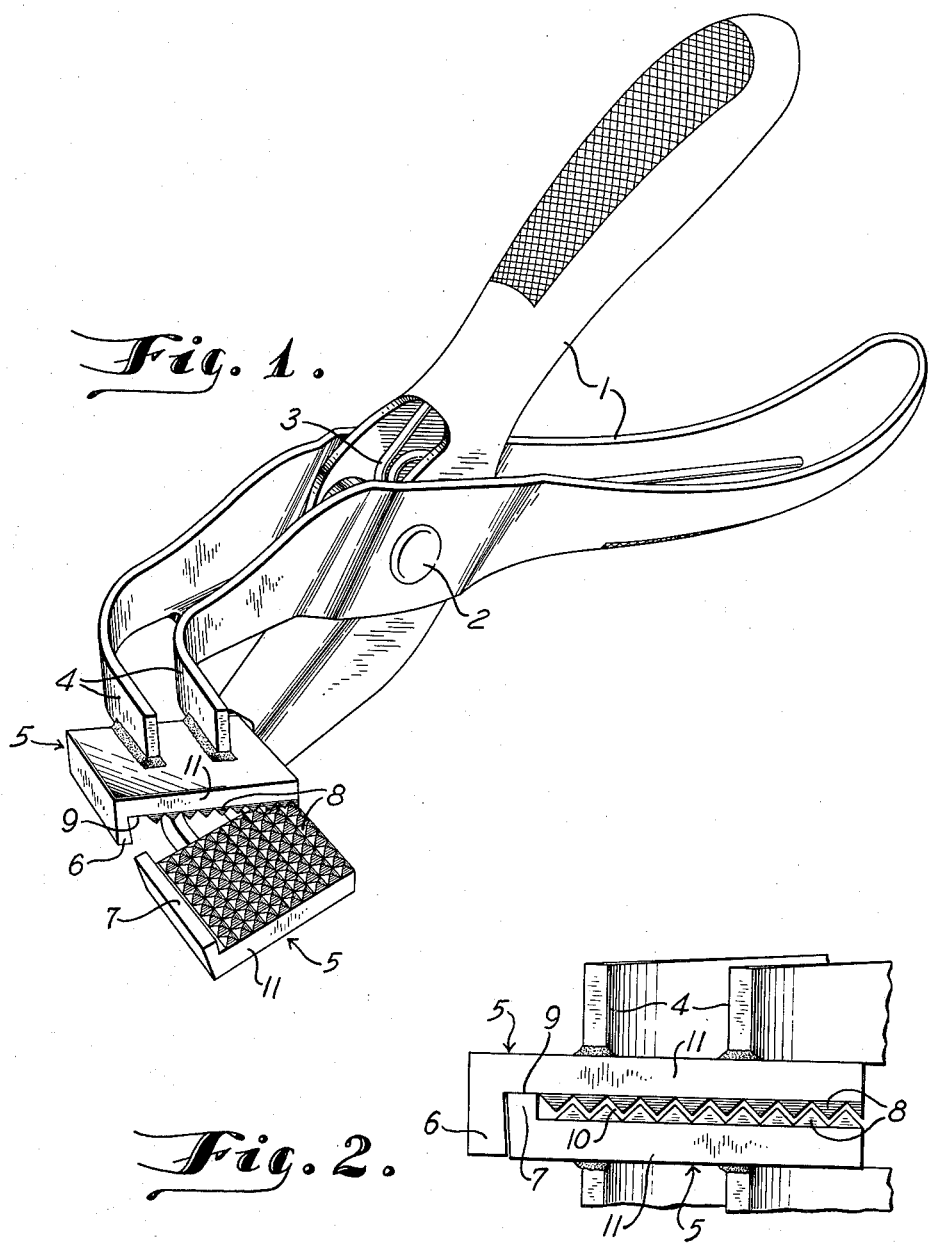

2,990,863
CHALAZA CLIPPING TOOL
Carl Pantermoller, 2844 S. Herman St., Milwaukee, Wis.
Filed July 9, 1958, Ser. No. 747,508
5 Claims. (Cl. 146—2)

This invention relates to an egg tool and more particularly to a tool designed to remove the chalaza from an egg.

The chalaza is a spiral band of thickened albuminous material in the white of the egg which extends from the yolk and is attached near the end of the egg to the lining membrane. Many people find the chalaza objectionable and attempt to remove the same from the egg prior to cooking. However, as the chalaza is attached to the yolk, removal by means of a fork or a broken piece of egg shell or the like, usually results in the yolk of the egg also breaking.

The present invention is directed to a tool or apparatus designed to clip the chalaza adjacent the yolk of the egg and hold the same after clipping so that it can be conveniently removed from the egg. The apparatus includes a pair of handles or arms which are pivotally connected together. Each arm carries a jaw provided with a cutting or snipping edge and an inner roughened or serrated surface. The jaws are closed by operation of the handles to cause the clipping edge to snip off the chalaza which is then held by the roughened surface of the jaws.

The jaws are designed so that when the clipping edge is in the closed position, the roughened or serrated surfaces of the jaws will not be seated, but instead a small clearance is provided between the roughened surfaces. This small clearance receives the chalaza and prevents the same from being mashed when the jaws are completely closed. As the chalaza is not mashed between the jaws, it can readily be removed from the jaws when the same are opened.

The present invention provides a simple and inexpensive device for cutting the chalaza from an egg yolk and removing the same from the area of the egg. Moreover, the device is substantially self-cleaning in that the chalaza will be readily removed from the jaws upon opening the same and will not adhere to the jaws.

Other objects and advantages of the invention will occur in the course of the following description.

The drawings illustrate the best mode presently contemplated of carrying out the invention.

In the drawings:

FIGURE 1 is a perspective view of the apparatus of the invention with the jaws in the open position; and FIG. 2 is an enlarged fragmentary side elevation showing the jaws in the closed position.

The drawings illustrate an apparatus or tool for removing the chalaza from the yolk of an egg which includes a pair of lever arms 1 or handles which are disposed in a common or parallel plane and are pivotally connected together by a pin 2. The arms 1 are biased to the open position by a spring 3 which is disposed within the generally concave interior of the arms and is provided with a circular bend in the area of the pin 2.

The working end of each arm 1 is provided with a generally right angle bend 4 and carries a jaw 5. One of the jaws 5 is provided with an outer flange 6 which extends generally transverse of the plane through the arms 1 and cooperates with a similar flange 7 provided on the other of the jaws 5 to provide a clipping or snipping edge.

In addition to the clipping edges, each jaw 5 is provided with a generally roughened surface 8 which extends from the respective edge 6 and 7 inwardly of the arms 1. As shown in the drawings, the roughened effect is obtained by providing the surface 8 with a series of serrations that extend both longitudinally and transversely of the plane of arms 1. The transverse and longitudinal serrations, in effect, provide a surface 8 having a series of pyramid-shaped projections.

As best shown in FIG. 2, when the jaws 5 are closed, the edge of the flange 7 is adapted to engage the surface 9 of the other jaw to provide the clipping action. In the closed position, the roughened surface 8 of one jaw is spaced from the roughened surface of the other jaw to provide a clearance 10 therebetween. In cutting the chalaza, the end of the chalaza adjacent the yolk is clipped by the engagement of the flange 7 with the surface 9 and the body of the chalaza is thereby disposed within the clearance 10. As the surfaces 8 are not in engagement when the jaws are closed, the chalaza will not be mashed between the mating surfaces and the serrations or pyramid-shaped projections on the surface 8 will prevent the chalaza from slipping out of the clearance until the jaws are opened.

As best shown in FIGURE 1, the longitudinal edges 11 of each jaw 5 which are adapted to be located adjacent the egg during the clipping operation are generally straight and are disposed parallel to the plane containing the handles 1. This results in a convenient location of the handles for operation when the jaws 5 are in position to clip the chalaza.

While the flanges 6 and 7 are shown as being in an overlapping relation to provide a biting action, it is contemplated that the edges 6 and 7 may engage each other to provide a pincer type of action to snip the chalaza.

The present invention provides a simple and inexpensive apparatus for removing the chalaza from an egg. The device not only cuts the chalaza, but also grips the cut chalaza without mashing the same so that it can be readily removed from the egg.

Various modes of carrying out the invention are contemplated as being within the scope of the following claims particularly pointing out and distinctly claiming the subject matter which is regarded as the invention.

I claim:

1. An apparatus for removing the chalaza from an egg, comprising a pair of arms connected together, and a pair of cooperated jaws connected to the arms and offset from said plane, each jaw having a clipping member extending laterally of said plane and disposed to cooperate with the clipping member of the other jaw to snip the chalaza and each jaw having a generally roughened surface disposed adjacent said clipping member and disposed to cooperate with the roughened surface of the other jaw to hold the chalaza after the same has been snipped, said roughened surfaces being spaced from each other when the jaws are in the closed position to provide a clearance therebetween to receive the snipped chalaza and prevent the same from being mashed.

2. A device for removing the chalaza from an egg, comprising a pair of arms pivotally connected together at the central portion thereof, and a jaw connected to the corresponding end of each of said arms, each jaw having a generally straight clipping member disposed on the outer end of the jaw in a direction away from the position of pivotal connection between the arms, said clipping member being disposed to cooperate with the clipping member of the other jaw to snip the chalaza, each jaw having a generally roughened surface disposed inwardly of said clipping member and adapted to cooperate with the roughened surface of the other jaw, said clipping members being disposed to seat when the jaws are in the closed position and the roughened surfaces being disposed to provide a clearance therebetween when the jaws are in the closed position to prevent mashing of the chalaza held between said surfaces.

3. An apparatus for removing the chalaza from an egg, comprising a pair of arms disposed in a substantially common plane and being pivotally connected together at the central portion thereof, a pair of cooperating jaws connected to the arms and offset from said plane, each jaw having a generally straight edge disposed parallel to said plane and having a clipping member extending laterally of said plane and located at the outer end of the jaw in a direction away from the position of pivotal connection between the arms, the clipping member of one jaw disposed to cooperate with the clipping member of the other jaw to snip the chalaza and each jaw having a generally roughened surface disposed adjacent said clipping member and disposed to cooperate with the roughened surface of the other jaw to hold the chalaza after the same has been snipped, said roughened surfaces being spaced from each other when the jaws are in the closed position to provide a clearance therebetween to receive the snipped chalaza and prevent the same from being mashed, and said roughened surfaces having a first series of generally parallel grooves and a second series of generally parallel grooves extending at an angle to said first series, said grooves serving to prevent the snipped chalaza from falling from said clearance.

4. An apparatus for removing the chalaza from an egg, comprising a pair of elongated handles connected together, and a jaw connected to the corresponding outer end of each handle, each jaw having a clipping member disposed transversely to the longitudinal dimension of the handle and located at the outer end of the jaw, each clipping member disposed to cooperate with the clipping member of the other jaw to snip the chalaza and each jaw having a roughened surface disposed adjacent the said clipping member and disposed to cooperate with the roughened surface of the other jaw to hold the chalaza after the same has been snipped, said roughened surface of each jaw comprising a series of serrations with the ridges of the serrations of one jaw adapted to complement the valleys of the serrations of the opposing jaw when the jaws are in the closed position, and said serrations being disposed out of contact with each other when the jaws are in the closed position to provide a clearance therebetween and prevent mashing of the chalaza.

5. An apparatus for removing the chalaza from an egg, comprising a pair of elongated handles connected together, and a jaw connected to the corresponding outer end of each handle, each jaw having a clipping member disposed transversely to the longitudinal dimension of the handle and located at the outer end of the jaw, each clipping member disposed to cooperate with the clipping member of the other jaw to snip the chalaza and each jaw having a roughened surface disposed adjacent said clipping member and disposed to cooperate with the roughened surface of the other jaw to hold the chalaza after the same has been snipped, said roughened surfaces of the jaws comprising a series of generally pyramid shaped projections and the projections of one jaw being disposed to complement the recesses between projections of the other jaw when the jaws are in the closed position, and said projections on one jaw being disposed out of contact with the projections on the other jaw when the jaws are closed to thereby provide a clearance between the projections and prevent mashing of the chalaza.

References Cited in the file of this patent

UNITED STATES PATENTS

| | | |
|---|---|---|
| 282,566 | Ramsey | Aug. 7, 1883 |
| 345,215 | Crocker | July 6, 1886 |
| 650,369 | Brown | May 29, 1900 |
| 921,080 | Burtscher | May 11, 1909 |
| 2,783,483 | Seher | Mar. 5, 1957 |